(12) United States Patent
Giffin et al.

(10) Patent No.: US 7,631,484 B2
(45) Date of Patent: Dec. 15, 2009

(54) HIGH PRESSURE RATIO AFT FAN

(76) Inventors: Rollin George Giffin, 7915 Shelldale Way, Cincinnati, OH (US) 45242; James Edward Johnson, 5957 Emerald Lake Dr., Fairfield, OH (US) 45014

(*) Notice: Subject to any disclaimer, the term of this patent is extended or adjusted under 35 U.S.C. 154(b) by 772 days.

(21) Appl. No.: 11/308,219

(22) Filed: Mar. 13, 2006

(65) Prior Publication Data

US 2007/0209368 A1   Sep. 13, 2007

(51) Int. Cl.
*F02K 3/02* (2006.01)

(52) U.S. Cl. .................................. 60/226.1; 60/262

(58) Field of Classification Search ............. 60/226.1, 60/262
See application file for complete search history.

(56) References Cited

U.S. PATENT DOCUMENTS

| | | | |
|---|---|---|---|
| 3,002,675 A | 10/1961 | Howell et al. | |
| 3,182,898 A | 5/1965 | Hewson | |
| 3,363,831 A | 1/1968 | Gamier | |
| 3,449,914 A | 6/1969 | Brown | |
| 3,540,682 A | 11/1970 | Dibble et al. | |
| 3,635,589 A | 1/1972 | Kristiansen | |
| 3,729,957 A | 5/1973 | Petrie et al. | |
| 4,043,121 A | 8/1977 | Thomas et al. | |
| 4,055,042 A | 10/1977 | Colley | |
| 4,165,949 A | 8/1979 | Riollet | |
| 5,281,087 A * | 1/1994 | Hines | 415/160 |
| 5,402,638 A | 4/1995 | Johnson | |
| 5,402,963 A | 4/1995 | Carey et al. | |
| 5,404,713 A | 4/1995 | Johnson | |
| 2005/0047942 A1 | 3/2005 | Grffin, III et al. | |
| 2005/0081509 A1 | 4/2005 | Johnson | |
| 2005/0109012 A1 * | 5/2005 | Johnson | 60/226.1 |
| 2006/0024162 A1 | 2/2006 | Giffin | |

FOREIGN PATENT DOCUMENTS

| | | |
|---|---|---|
| DE | 2055365 | 5/1972 |
| EP | 0646720 B1 | 2/1998 |
| EP | 0646721 B1 | 2/1998 |

* cited by examiner

*Primary Examiner*—Michael Cuff
*Assistant Examiner*—Vikansha S Dwivedi
(74) *Attorney, Agent, or Firm*—Adams Intellectual Property Law; David L. Narciso

(57) ABSTRACT

A fan assembly for a gas turbine engine includes a turbine rotor adapted to be disposed aft of a core of the gas turbine engine; a row of turbine blades carried by the rotor, each turbine blade extending from the rotor to a tip, the turbine blades adapted to extract energy from a stream of pressurized combustion gases generated by the core; and at least two rows of axially-spaced apart, radially-extending fan blades carried by the row of turbine blades for rotation therewith.

13 Claims, 3 Drawing Sheets

HIGH PRESSURE RATIO AFT FAN

BACKGROUND OF THE INVENTION

This invention relates generally to gas turbine engines and more particularly to an aft fan for a gas turbine engine.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan.

Some prior art engine configurations incorporate an aft fan stage integral with a turbine rotor. There are several potential advantages for this "fan on turbine" configuration, which eliminates the drive shaft required in a front-fan engine. It is desired to have such a fan-on-turbine with a design pressure ratio (i.e. the ratio of total pressure at the fan exit to the total pressure at the fan inlet) of about 2.5 or greater. Unfortunately, the high tip speed required for a single fan stage to produce this pressure ratio is contrary the $AN^2$ and radius ratio constraints dictated by accepted turbine design practice.

Accordingly, there is a need for a fan-on-turbine configuration which achieves a high pressure ratio.

BRIEF SUMMARY OF THE INVENTION

The above-mentioned need is met by the present invention, which according to one aspect provides a fan assembly for a gas turbine engine, including: a turbine rotor adapted to be disposed aft of a core of the gas turbine engine; a row of turbine blades carried by the rotor, each turbine blade extending from the rotor to a tip, the turbine blades adapted to extract energy from a stream of pressurized combustion gases generated by the core; and at least two rows of axially-spaced apart, radially-extending fan blades carried by the row of turbine blades for rotation therewith.

According to another aspect of the invention, a gas turbine engine includes a core for generating a stream of pressurized combustion gases, including in sequential flow order: a compressor, a combustor, and a high-pressure turbine; and a fan assembly having a turbine rotor and disposed aft of the core; a row of turbine blades carried by said rotor, each turbine blade extending from the rotor to a tip, said turbine blades adapted to extract energy from the combustion gases; and at least two rows of axially-spaced apart, radially-extending fan blades carried by the row of turbine blades for rotation therewith.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
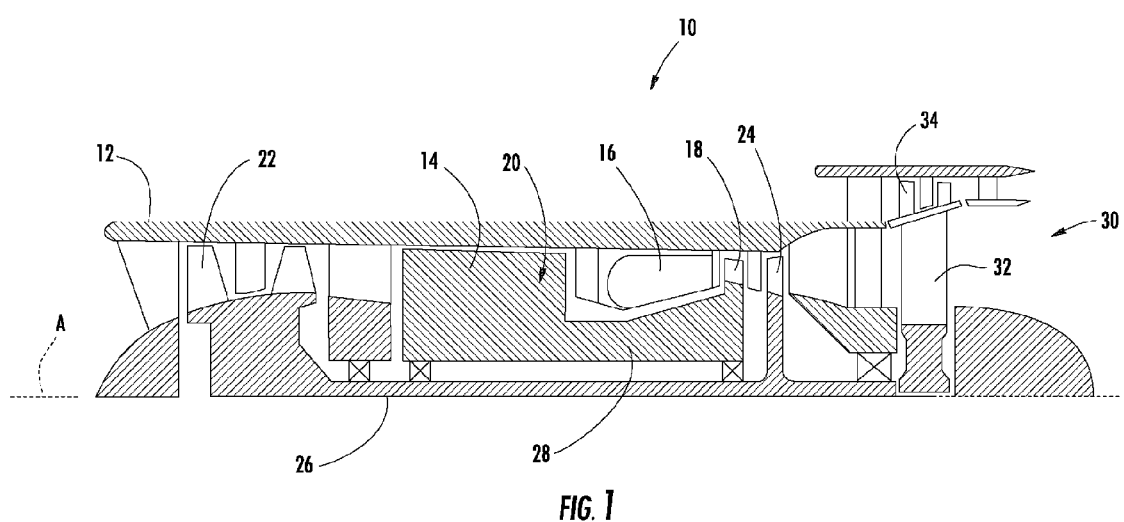
FIG. 1 is a schematic cross-sectional view of a gas turbine engine constructed in accordance with an aspect of the present invention.

Referring to the drawings wherein identical reference numerals denote the same elements throughout the various views, FIG. 1 illustrates a representative gas turbine engine, generally designated 10. The engine 10 has a longitudinal center line or axis A and an outer stationary annular casing 12 disposed concentrically about and coaxially along the axis A. The engine 10 has a high-pressure compressor 14, combustor 16, and high pressure turbine ("HPT") 18 arranged in serial flow relationship, collectively forming a core 20. A forward compressor rotor (e.g., low-pressure compressor, fan, or booster) 22 may be provided, driven by a low-pressure turbine 24 through an LP shaft 26. In operation, pressurized air from the compressor 14 is mixed with fuel in the combustor 16 and ignited, thereby generating combustion gases. Some work is extracted from these gases by the high pressure turbine 18 which drives the compressor 14 via shaft 28, and by the low pressure turbine 24, which drives the booster 22. The combustion gases then flow into an aft fan assembly 30 disposed aft of the core 20. The aft fan assembly 30 comprises a free turbine or work turbine 32 which drives an integral aft fan 34.

Figure 2:
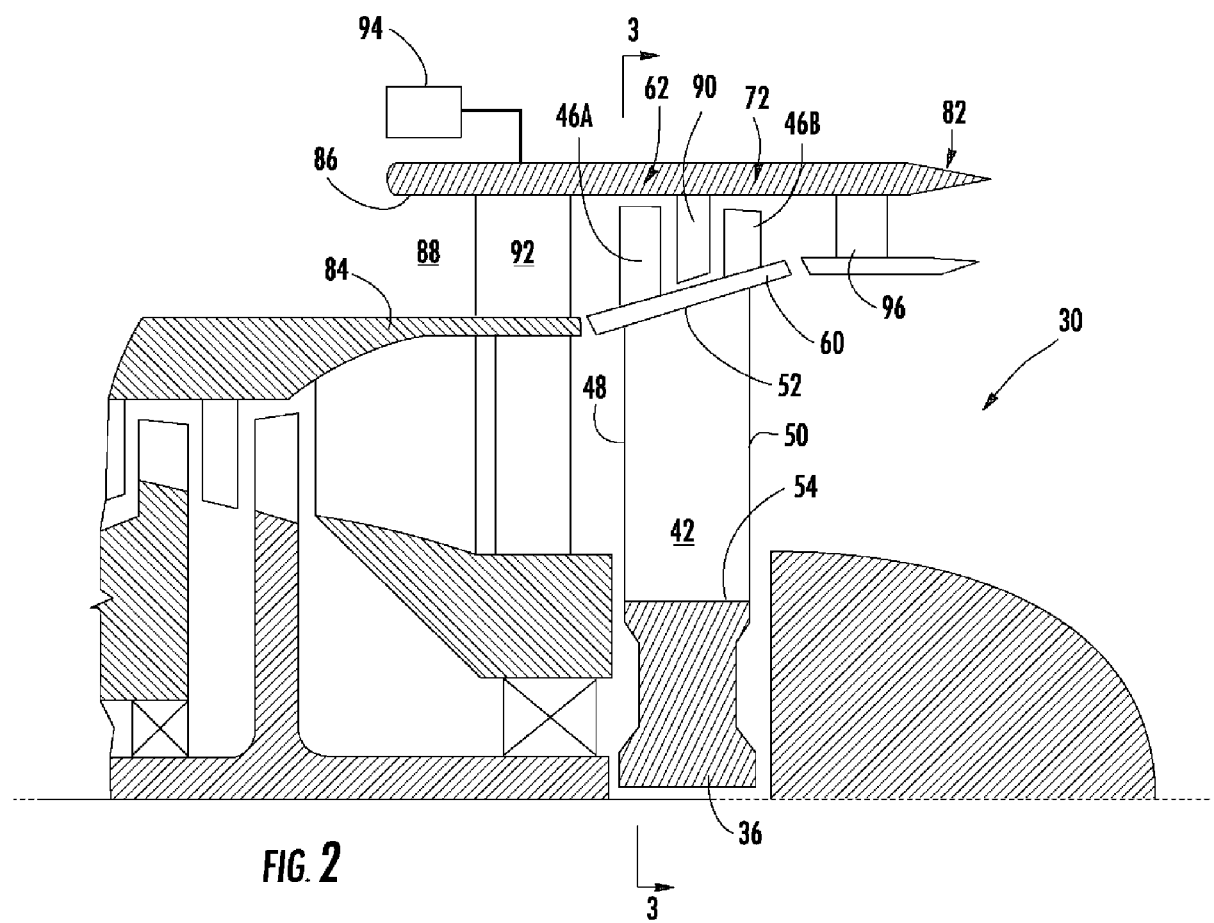
FIG. 2 is an enlarged view of a portion of the gas turbine engine of FIG. 1.
Figure 3:
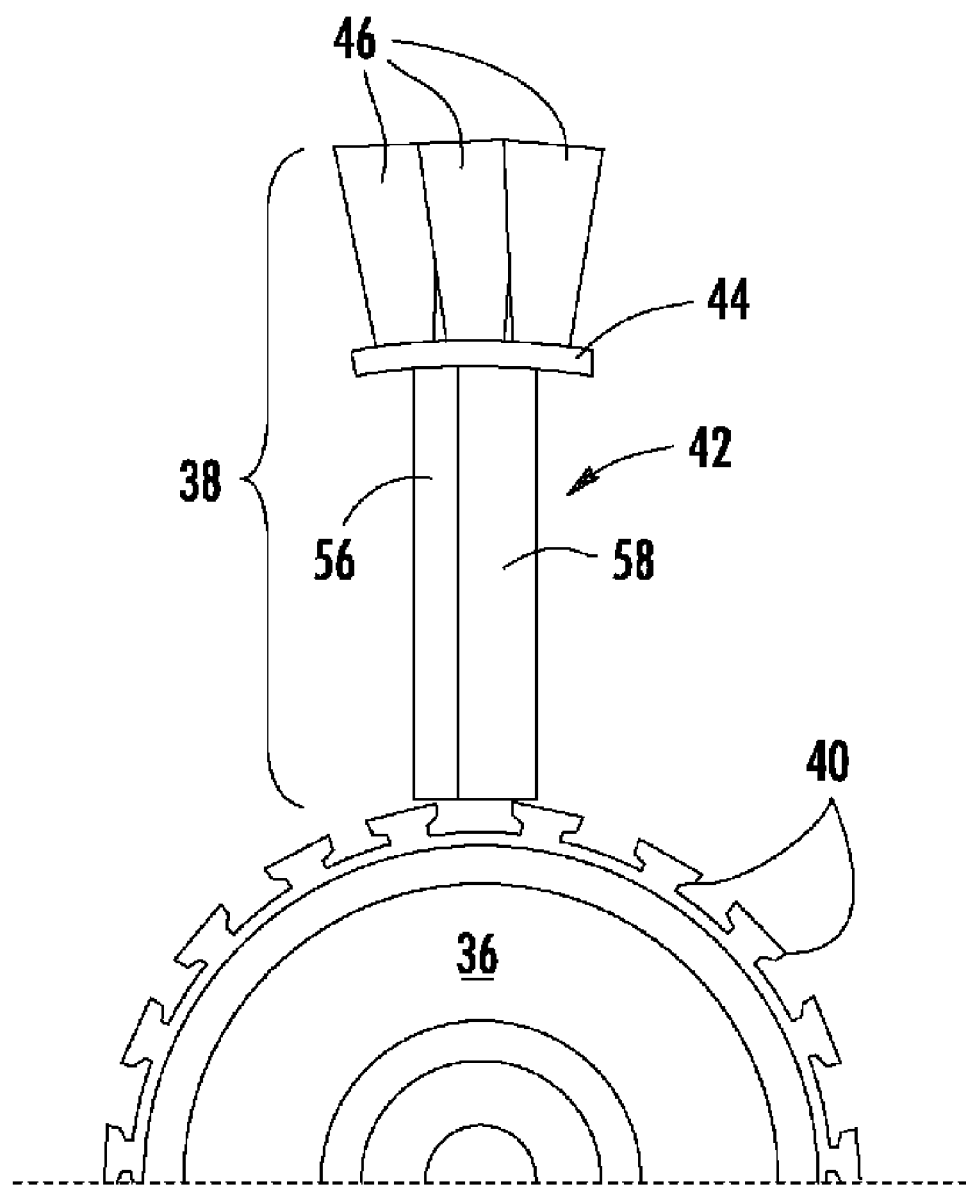
FIG. 3 is a view taken along lines 3-3 of FIG. 2.

FIGS. 2 and 3 illustrate the aft fan assembly 30 in more detail. The aft fan assembly 30 includes a hub or rotor 36 carrying a plurality of compound blades 38 in dovetail slots 40 and extending radially therefrom. Each of the compound blades 38 includes a turbine blade 42, an arcuate platform segment 44, and a plurality of fan blades 46.

In the illustrated example, each compound blade 38, including the turbine blade 42, its platform segment 44, and the associated fan blades 46 is made as an integral component, for example by casting, forging, machining, or by fabrication (e.g. welding, brazing) from sub-components. The compound blades 38 could also be built-up as a mechanical assembly of individual components.

Each of the turbine blades 42 is an airfoil having a leading edge 48, a trailing edge 50, a tip 52, a root 54, a convex suction side 56, and a concave pressure side 58. The turbine blades 42 are shaped to extract energy from the stream of pressurized gases exiting the core 20 to turn the rotor 36. Depending upon the particular application, the turbine blades 42 may be provided with internal channels (not shown) connected to a source of cooling air to lower their temperature.

Each platform segment 44 extends away from the associated turbine blade 42 in axial and circumferential directions. The platform segments 44 abut each other and collectively define an annular platform 60 interconnecting the tips 52 of the turbine blades 42.

The fan blades 46 are grouped into circumferential arrays referred to as "rows" or "stages". A row 62 of first fan blades 46A extends radially outward from the platform 60. Each of the first fan blades 46A is an airfoil having leading and trailing edges, a tip and a root, and opposed pressure and suction sides.

A row 72 of second fan blades 46B extends radially outward from the platform 60, downstream of the first fan blades 46A. Each of the second fan blades 46B is an airfoil having leading and trailing edges, a tip and a root, and opposed pressure and suction sides.

The number of fan blades 46 in each row 62 and 72 will vary depending on the specific application. The fan blades 46 have a reduced chord as compared to prior art fan-on-turbine designs. In order to preserve a selected solidity ratio of the rows 62 and 72, a greater number of fan blades 46A and 46B are used in each of the rows 62 and 72, as compared to a prior art fan-on-turbine design. This results in each turbine blade 42 carrying two or more first fan blades 46A and two or more second fan blades 46B. In the illustrated example, three first fan blades 46A and three second fan blades 46B extend from each platform segment 44, for a total of six fan blades 46 per turbine blade 42. Greater or lesser numbers of fan blades 46 may be used for each turbine blade 42 to suit a specific application.

The fan blades 46 are surrounded by an annular casing 82 having inner and outer walls 84 and 86. The inner surface of the outer wall 86 defines the outer boundary of a bypass duct 88 and the outer surface of the inner wall 84 defines the inner boundary of the bypass duct 88, in cooperation with the platform 60. A circumferential array of airfoil-shaped fan stator vanes 90 extends radially inward into the bypass duct 88 between the first and second fan rows 62 and 72, and serves to redirect air flow exiting the first fan blades 46A into the second fan blades 46B at a desired angle.

A circumferential array of radially-extending, airfoil-shaped inlet guide vanes ("IGVs") 92 may be disposed in the bypass duct 88 forward of the fan blades 46. The IGVs 92, or portions thereof, are moveable so as to change their effective angle of attack relative to the air flow entering the bypass duct 88. The IGVs 92 may be adjusted during engine operation to modulate air flow through the aft fan 34. The IGVs may be operated using appropriate actuators 94 under the control of a FADEC, PMC, manual control, or other known type of engine control (not shown).

A circumferential array of radially-extending, airfoil-shaped outlet guide vanes ("OGVs") 96 is also disposed in the bypass duct 88, aft of the fan blades 46.

The above-described aft fan assembly 30 is able to achieve greater work input than prior art fan-on-turbine designs without adding the complexity of additional turbine stages. For example, if a single fan stage that is capable of producing a pressure ratio of about 2.0 at a design operating condition, the two-stage design described above could enable a pressure ratio of about 3.5. To the extent that enough energy is available from the turbine 32, more stages of fan blades 46 could be added.

The foregoing has described a high pressure ratio aft fan for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A fan assembly for a gas turbine engine having an inner wall, a core that generates pressurized combustion gases within the inner wall, and an outer wall radially spaced from the inner wall by a bypass duct that bypasses the core, the fan assembly comprising:
   (a) turbine rotor disposed aft of the core of the gas turbine engine;
   (b) a circumferential row of compound blades attached to and extending radially from the rotor, each compound blade comprising:
      (i) a turbine blade having a first end attached to the rotor and a second end extending radially from the rotor, the turbine blade disposed aft of the core to extract energy from the pressurized combustion gases generated by the core;
      (ii) a circumferential first row of fan blades attached to the second end of the turbine blade and extending radially from the turbine blade, the first row of fan blades disposed aft of the bypasses duct of the gas turbine engine;
      (iii) a circumferential second row of fan blades attached to the second end of the turbine blade and extending radially from the turbine blade, the second row of fan blades disposed aft of the first row of fan blades; and
   (c) a circumferential row of stator vanes extending radially inwardly from the outer wall of the gas turbine engine and disposed between the first and second rows of fan blades.

2. The fan assembly of claim 1 wherein the first and second rows of fan blades are disposed in an annular bypass duct.

3. The fan assembly of claim 2 wherein variable-angle inlet guide vanes are disposed in the bypass duct upstream of the first and second rows of fan blades.

4. The fan assembly of claim 2 wherein outlet guide vanes are disposed in the bypass duct downstream of the first and second rows of fan blades.

5. The fan assembly of claim 1 wherein each compound blade includes an arcuate platform segment disposed between the turbine blade and the first and second rows of fan blades, the platform segments of circumferentially adjacent compound blades abutting each other so as to define an annular platform disposed radially between the turbine blades and the fan blades.

6. The fan assembly of claim 1 wherein the fan assembly has a pressure ratio greater than about 2.5 at a predetermined operating condition.

7. A gas turbine engine, comprising:
   a core for generating a stream of pressurized combustion gases, including in sequential flow order: a compressor, a combustor, and a high-pressure turbine;
   an inner wall disposed about the core;
   an outer wall disposed at least partially about the inner wall and defining an annular bypass duct between the inner wall and outer wall; and
   a fan assembly comprising:
      a turbine rotor disposed aft of the core;
      a circumferential row of turbine blades carried by said rotor, each turbine blade extending from the rotor to a tip, said turbine blades adapted to extract energy from the combustion gases;
      at least two axially-spaced apart circumferential rows of radially-extending fan blades disposed aft of the bypass duct, the fan blades carried by the row of turbine blades for rotation therewith; and
      a plurality of stator vanes disposed between the first and second rows of fan blades.

8. The gas turbine engine of claim 7 wherein variable-angle inlet guide vanes are disposed in the bypass duct upstream of the fan blades.

9. The gas turbine engine of claim 7 wherein outlet guide vanes are disposed downstream of the fan blades.

10. The gas turbine engine of claim 7 wherein each turbine blade includes an arcuate platform segment, the platform segments abutting each other so as to define an annular platform.

11. The gas turbine engine of claim 7 wherein each turbine blade carries:
   at least two circumferentially spaced-apart, radially-extending first fan blades extending from the tip of the turbine blade; and
   at least two circumferentially spaced-apart, radially-extending second fan blades extending from the tip of the turbine blade at a location downstream from the first fan blades.

12. The gas turbine engine of claim 7 wherein the fan assembly has a pressure ratio greater than about 2.5 at a predetermined operating condition.

13. The gas turbine engine of claim 7 further comprising:
a low-pressure turbine disposed between the core and the turbine rotor;
a forward compressor rotor disposed forward of the core; and
a shaft connecting the low-pressure turbine and the forward compressor rotor.

* * * * *